US010981080B2

(12) United States Patent
Olausson

(10) Patent No.: US 10,981,080 B2
(45) Date of Patent: Apr. 20, 2021

(54) HEAT TRANSFER TUBE AND METHOD FOR MANUFACTURING A HEAT TRANSFER TUBE

(71) Applicant: VALMET AB, Sundsvall (SE)

(72) Inventor: Lars Olausson, Angered (SE)

(73) Assignee: VALMET AB, Sundsvall (SE)

(*) Notice: Subject to any disclaimer, the term of this patent is extended or adjusted under 35 U.S.C. 154(b) by 0 days.

(21) Appl. No.: 16/481,548

(22) PCT Filed: Feb. 2, 2018

(86) PCT No.: PCT/SE2018/050088
§ 371 (c)(1),
(2) Date: Jul. 29, 2019

(87) PCT Pub. No.: WO2018/143885
PCT Pub. Date: Aug. 9, 2018

(65) Prior Publication Data
US 2020/0024802 A1 Jan. 23, 2020

(30) Foreign Application Priority Data
Feb. 3, 2017 (SE) .................................. 1750094-3

(51) Int. Cl.
*B01D 1/06* (2006.01)
*B01D 1/30* (2006.01)
(Continued)

(52) U.S. Cl.
CPC .............. *B01D 1/065* (2013.01); *B01D 1/30* (2013.01); *B21D 22/02* (2013.01); *B21D 51/10* (2013.01);
(Continued)

(58) Field of Classification Search
CPC . B01D 1/06; B01D 1/065; B01D 1/30; B21D 22/02; B21D 51/10; D21C 11/0007;
(Continued)

(56) References Cited

U.S. PATENT DOCUMENTS 3,826,304 A 7/1974 Withers et al.
4,251,907 A 2/1981 Bleckmann et al.
(Continued)

FOREIGN PATENT DOCUMENTS

CN 1239218 A 12/1999
CN 201145509 Y 11/2008
(Continued)

OTHER PUBLICATIONS

USPTO Notice of Allowance, U.S. Appl. No. 16/481,551, dated Jul. 13, 2020, 12 pages.
(Continued)

*Primary Examiner* — Brian A McCaig
(74) *Attorney, Agent, or Firm* — Foley & Lardner LLP

(57) ABSTRACT

The invention relates to a heat transfer tube (9) for falling film evaporation having a heating medium surface (21) to be heated by a heating medium, a falling film surface (20) to have spent liquor passing over it, and being made from an iron based high alloy stainless steel material with an alloy content above 16.00% for Chromium and above 1% for Nickel. The falling film surface of the heat transfer tube is equipped with one or several protrusions/indentations forming a multitude of stamped bumps (SB) on the envelope surface of a heat transfer tube such that the distance between adjacent stamped bumps (SB) along a line on the envelope surface parallel to the longitudinal axis of the heat transfer tube is within the range of 3 to 250 mm, said stamped bumps (SB) having a height (hp) in the range 0.3 to 5.0 mm, a width (wp) in the range 1.0-20 mm, and an inclination angle (a)
(Continued)

versus a plane orthogonal to a longitudinal axis (CC) of the heat transfer tube in a range of 0-70 degrees so that each stamped bump (SB) is inclined and extends along at least a portion of the heat transfer tube or extend within a plane orthogonal to the longitudinal axis of the heat transfer tube. The invention also relates to a method for manufacturing said heat transfer tube.

19 Claims, 7 Drawing Sheets

(51) Int. Cl.
*F28F 1/34* (2006.01)
*B21D 22/02* (2006.01)
*B21D 51/10* (2006.01)
*D21C 11/00* (2006.01)
*D21C 11/10* (2006.01)
*B23K 11/00* (2006.01)
*B23K 11/16* (2006.01)
*B23K 101/06* (2006.01)
*B23K 103/04* (2006.01)
*B23K 101/08* (2006.01)

(52) U.S. Cl.
CPC .......... *B23K 11/0073* (2013.01); *B23K 11/16* (2013.01); *D21C 11/0007* (2013.01); *D21C 11/10* (2013.01); *F28F 1/34* (2013.01); *B23K 2101/06* (2018.08); *B23K 2101/08* (2018.08); *B23K 2103/05* (2018.08); *F28F 2275/06* (2013.01)

(58) Field of Classification Search
CPC ..... D21C 11/10; B23K 11/0073; B23K 11/16; F28F 1/34; F28F 1/426; F28F 3/044; F28F 21/083; F28D 5/02; F28D 7/16
See application file for complete search history.

(56) References Cited

U.S. PATENT DOCUMENTS

| | | |
|---|---|---|
| 6,013,890 A | 1/2000 | Hulsizer |
| 6,056,048 A | 5/2000 | Takahashi et al. |
| 6,655,451 B2 | 12/2003 | Tada et al. |
| 2003/0089489 A1 | 5/2003 | Tada et al. |
| 2012/0214017 A1 | 8/2012 | Murphy et al. |
| 2015/0184845 A1 | 7/2015 | Lobscheid |

FOREIGN PATENT DOCUMENTS

| | | |
|---|---|---|
| CN | 2012397073 Y | 2/2010 |
| CN | 102706199 A | 10/2012 |
| DE | 36 43 794 C1 | 12/1987 |
| JP | 58-084001 A | 5/1983 |
| WO | WO 96/01140 A1 | 1/1996 |
| WO | WO 96/32998 A1 | 10/1996 |

OTHER PUBLICATIONS

USPTO Office Action, U.S. Appl. No. 16/481,553, dated Jun. 19, 2020, 11 pages.
Extended European Search Report, Application No. 18747562.9, dated Mar. 16, 2020, 8 pages.
Extended European Search Report, Application No. 18748565.1, dated Mar. 16, 2020, 8 pages.
Extended European Search Report, Application No. 18748566.9, dated Mar. 19, 2020, 9 pages.
USPTO Office Action, U.S. Appl. No. 16/481,551, dated Oct. 20, 2020, 8 pages.
USPTO Notice of Allowance, U.S. Appl. No. 16/481,551, dated Dec. 4, 2020, 10 pages.
USPTO Notice of Allowance, U.S. Appl. No. 16/481,553, dated Nov. 25, 2020, 9 pages.
Search Report Issued in Chinese Patent Application No. 2018800093816 dated Feb. 2, 2021, three (3) pages.

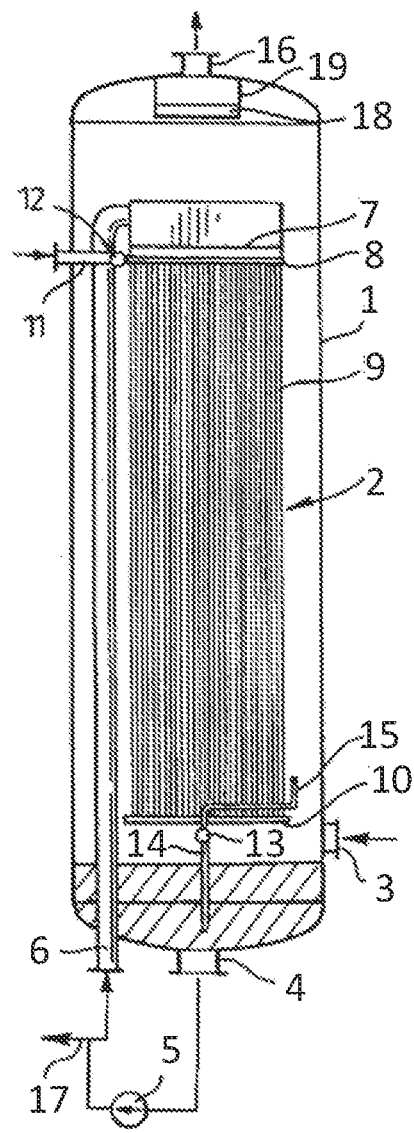
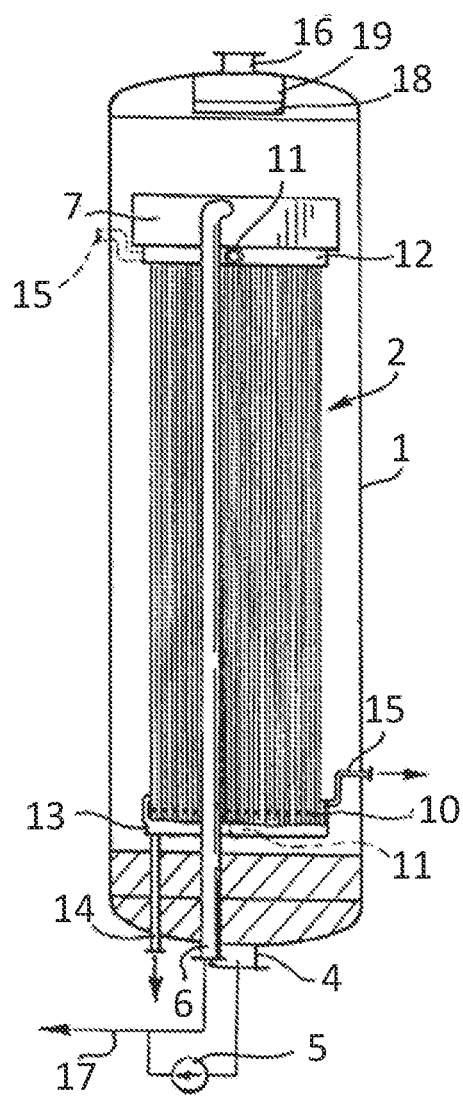
Fig. 1a
Fig. 1b

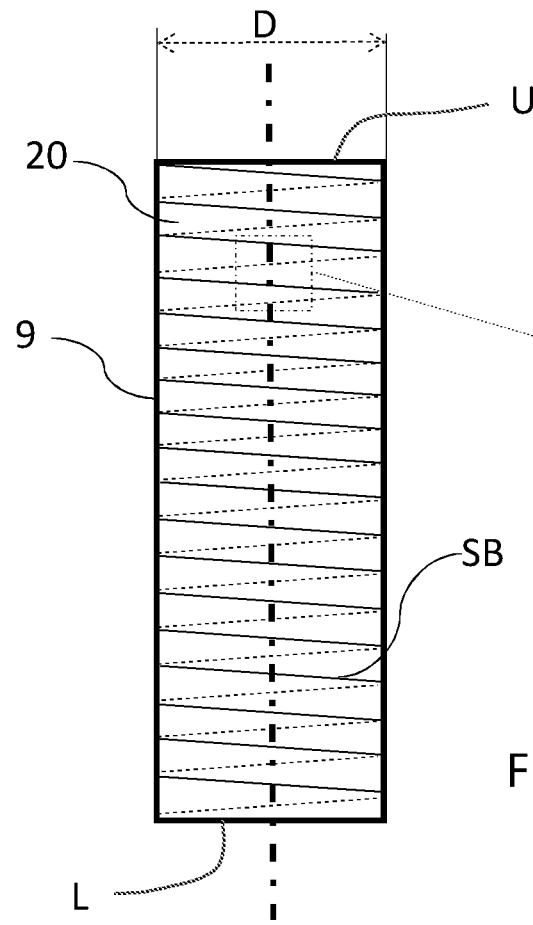
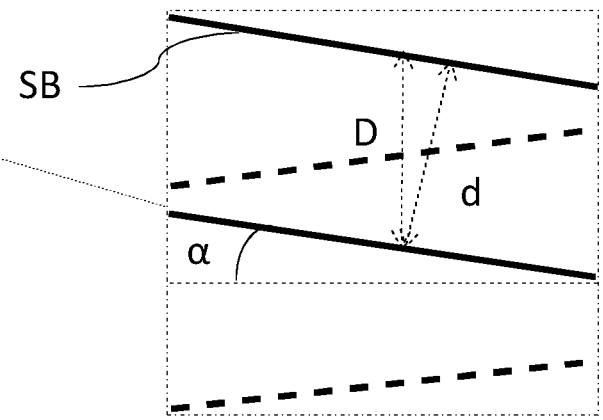
Fig. 3b
Fig. 3a
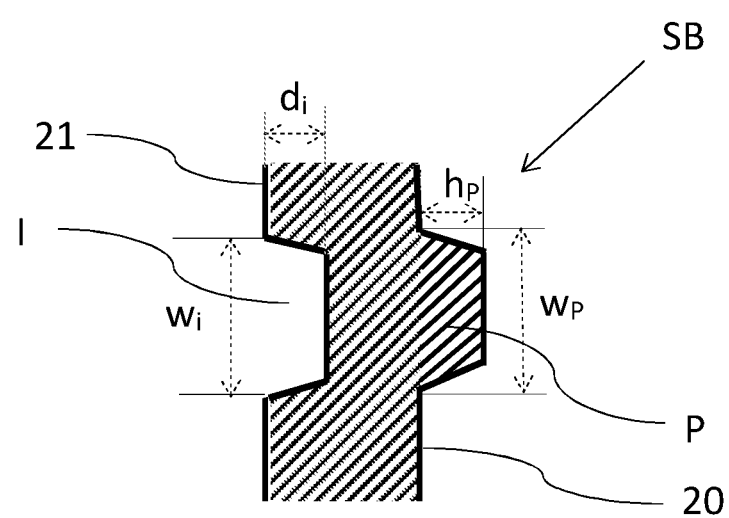
Fig. 3c

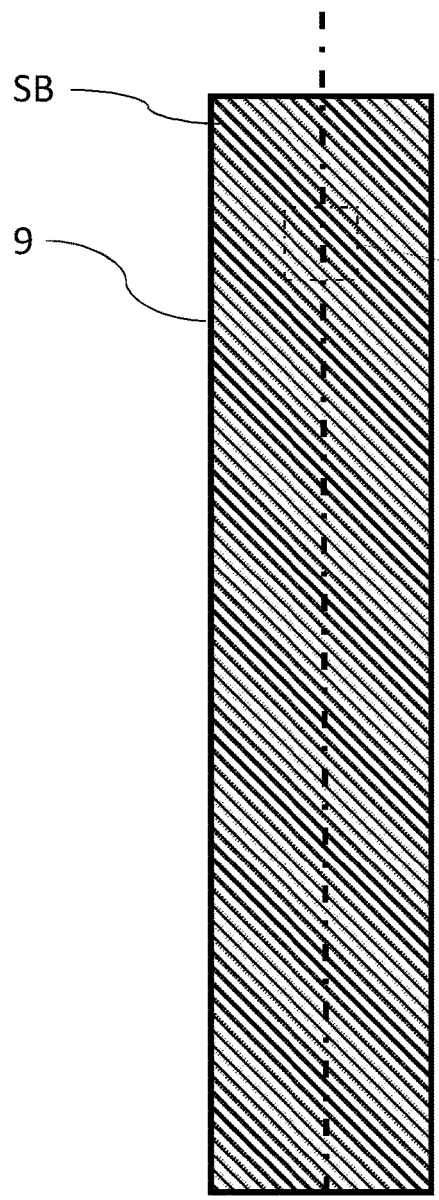
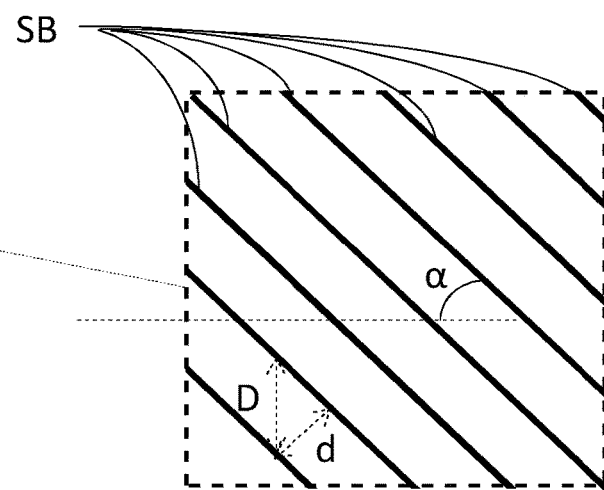
Fig. 4b
Fig. 4a
CC

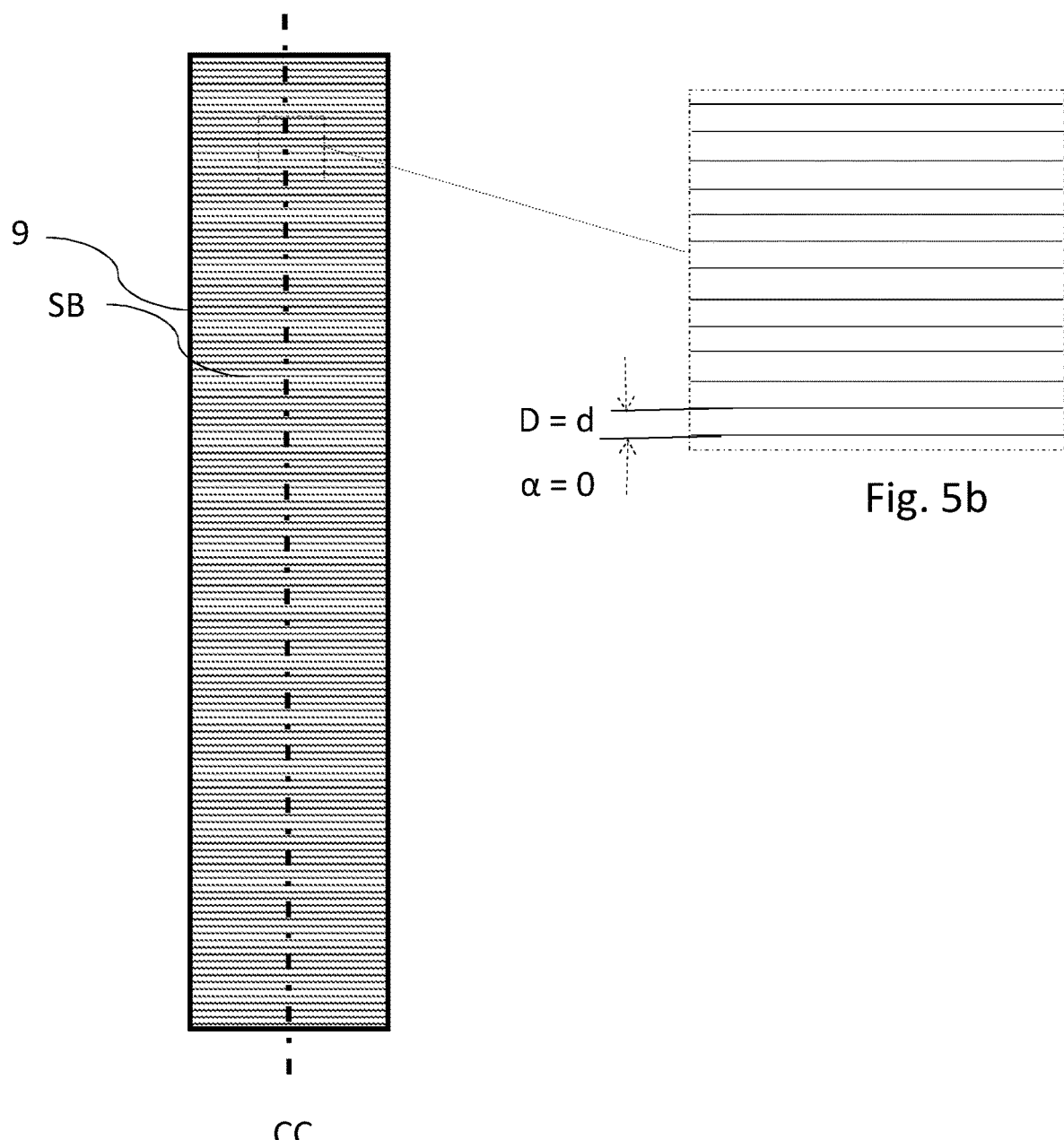

HEAT TRANSFER TUBE AND METHOD FOR MANUFACTURING A HEAT TRANSFER TUBE

TECHNICAL FIELD

The invention relates to a heat transfer tube for falling film evaporation of spent liquor. The heat transfer tube has a heating medium surface arranged to be heated by a heating medium, and a falling film surface opposite and facing away from said heating medium surface, which falling film surface is arranged to have spent liquor containing lignin and other dissolved components from cellulosic material and/or inorganics from the cellulosic material and chemicals used passing over it as a falling film while evaporating solvent (mainly water) from the falling film and thus increasing the dry matter content as well as viscosity. The invention also relates to a method for manufacturing a heat transfer tube for falling film evaporation of spent liquor as disclosed above.

BACKGROUND

In the general technology area of improving heat transfer a multitude of designs for heat transfer surfaces have been proposed. However, improving heat transfer surfaces in evaporation stages for spent liquor in pulp mills has proven to be difficult. These liquids of biological origin often contain a high concentration of dry matter in the form of fiber residues, lignin and salts causing fouling and scaling in said evaporation stages. The dry matter content may in a first evaporation stage lie at 20% or more, and in final evaporation stages even reach 80% or more, before the spent liquor is burned in the recovery boiler. Hence, to prevent such formation of fouling and scaling, heat transfer tubes are predominantly equipped with smooth surfaces on the spent liquor side. However, even with such smooth surfaces it is often seen that precipitations are collected in the lower parts of said evaporation stages, requiring shut down and intensive cleaning actions. In what evaporation position of flow these precipitations occur, i.e. $1^{st}$-$2^{nd}$-$3^{rd}$-$4^{th}$-$5^{th}$-$6^{th}$ or $7^{th}$ evaporation effect in the evaporation train, depends upon the current concentration of different dry matter content, and that may shift from one mill to another depending upon chemical profiling of the processes used and type and origin of cellulosic material. In order to clean the heat transfer tubes, there is a need to wash the heat transfer tubes using rather tough cleaning methods such as high pressure cleaning equipment, steam cleaning or acid cleaning. Any modifications of the surfaces must be made in such a way that the heat transfer tubes may be washed while still allowing a functional cleaning of the tubes. In particular, the surface modifications must be made such that they not will be destroyed or damaged to any greater extent from the cleaning operation.

OBJECT OF THE INVENTION

A first object of the invention is to provide an improved heat transfer tube for falling film evaporation of spent liquor containing lignin and other dissolved components from cellulosic material and/or inorganics from the cellulosic material and chemicals used.

A second object of the invention is to provide a method for manufacturing such a heat transfer tube.

Definitions

A butt weld is a weld that is applied between two abutting edges and merges these edges into via said butt weld.

For the purpose of this disclosure, the term thin layer or falling film (of spent liquor) is a layer of spent liquor that preferably has a thickness of 1-10 mm, which flows over a heated surface and on the opposite side of the layer is exposed to a gaseous environment into which the solvent will evaporate. The spent liquor may, for example, be spent cooking liquor.

Concerning the expression stamped bumps, it is generally considered that if a there are bumps present at separate locations on the envelope surface, separated in the longitudinal direction of the heat transfer tube, are these stamped bumps considered to be separate bumps even though if they happen to form part of the same elongated protrusion or groove. For example, if a helically inclined protrusion crosses a line on the envelope surface parallel to the longitudinal axis of the heat transfer tube at several points, each crossing point with the elongated protrusion is considered to be a separate stamped bump. Furthermore, the expression "stamped bump" is stipulated to include any protrusion/indentation in the sheet material made by any kind of method involving a modification of the sheet metal material causing a protrusion/indentation in the sheet material.

By envelope surface is meant both the outside and inside of the tube.

The Invention

The invention relates to a heat transfer tube for falling film evaporation of water solutions and suspensions emanating from handling of materials of biological origin, e.g. spent liquor from production of cellulose pulp. The heat transfer tube has a heating medium surface arranged to be heated by a heating medium and a falling film surface opposite and facing away from said heating medium surface. The falling film surface is arranged to have spent liquor containing lignin and other dissolved components from cellulosic material and/or inorganics from the cellulosic material and chemicals used passing over it as a falling film while evaporating solvent from the falling film and thus increasing the dry matter content. The heat transfer tube is made from a sheet metal material. The material used may suitably be normal corrosion resistant pressure vessel materials e.g. different grades of stainless steels and similar materials normally utilized in evaporation of these types of water solutions and suspensions. The heat transfer tubes in these applications are typically made from an iron based stainless steel material, e.g. a material with an alloy content above 16.00% for Chromium and above 1% for Nickel, preferably corresponding to corrosion resistant steel qualities like AISI 316 or AISI 304 or better or Duplex. Said steel qualities withstand the high alkali concentration in combination with high sulfidity concentration that may cause Stress Corrosion Cracking (SSC). AISI 316 has an alloy composition of Cr:16.00-18.00%, Ni:10.00-12.00%; Mo 2.00-2.50%; AISI 304 has an alloy composition of Cr:17.50-18.50%, Ni 8.00-10.00%; Lean Duplex/ASTM S32101 has an alloy composition of Cr:21.00-24.00%, Ni:1.00-5.50%; Mo0.10-0.60%; and Lean Duplex/ASTM S32304 has an alloy composition of Cr:21.00-25.00%, Ni:3.00-6.00%; Mo:0.1-0.6%.

Water solutions of "biological origin" could also include paper mills, agricultural operations, algae farming, animal farming, plant production, fish farming, municipal waste handling and sugar manufacturing all generating water solutions and suspension containing fibers and particles and carrying dissolved organic solutions and inorganic salts which will solidify during the evaporation process all factors that will generate fouling problems.

The falling film surface of the heat transfer tube is equipped with a multitude of stamped bumps formed by any suitable method for forming protrusions or indentations, preferably protrusions, as seen in a direction along the longitudinal extension of the heat transfer tube. Each stamped bump is spaced apart along the longitudinal axis of the heat transfer tube from a neighboring stamped bump by 3 to 250 mm, i.e. the distance between the closest parts of a protrusion or indentation of two neighbouring bumps along the longitudinal axis of the heat transfer tube. The stamped bumps have a height or depth, measured orthogonally to the falling film surface, in the range of 0.3 to 5.0 mm and a width, measured along the falling film surface orthogonally to the longitudinal extension of the stamped bump, in the range 1 to 20 mm. The stamped bumps have a longitudinal extension within a plane orthogonal to the longitudinal axis of the heat transfer tube or with an inclination angle versus a plane orthogonal to a longitudinal axis of the heat transfer tube of up to 70 degrees. The stamped bumps can be formed by one or several continuous protrusions/indentations all around the envelope surface of the tube or split up into individual protrusions/indentations with different shapes and arrangements as will be further exemplified in the detailed description.

Alternatively, the protrusions/indentations could be made as an overall ring shaped pattern, continuous or discontinuous, on the envelope surface of the heat transfer tube and the ring shaped pattern may be inclined or extend within a plane orthogonal to the longitudinal axis of the heat transfer tube while forming stamped bumps on the falling film surface. It is also possible to have a multitude of smaller protrusions/indentations, either of the same lengths or different lengths, forming the stamped bumps. Hence, there is a multitude of ways in designing the protrusions/indentations such that the distance along the longitudinal axis of the heat transfer tube between adjacent stamped bumps is within the range of 0 to 250 mm.

These stamped bumps provide for a disturbance or turbulence in the thin film of spent cooking liquor that increases the heat transfer rate. This solution also ensures that the tubes are still accessible for steam or acid spraying lances for steam or acid cleaning. A suitable way of forming the bumps is to stamp them into a flat sheet metal material, e.g. sheet metal plates which may be coiled strips of suitable width, which thereafter are formed to heat exchanger tubes. The stamped bumps are textured onto the sheet metal, to the desired structure for enhanced falling film evaporation, by press or stamp forming or roll forming in one or more successive operation steps with no or minimal loss of materials followed by possible cleaning and finishing operations. A further advantage with providing a textured surface of the falling film surface as described above is that there will also be a textured surface on the opposite side, the heating media surface, which also will provide for an increased heat transfer on the heating media side. In general, the surface side with protrusions is preferably utilized as the falling film surface and the surface side with indentations as the heating media surface.

According to one embodiment are the heat transfer tubes made by forming the bumps such that they are stamped into and stretching continuously from one side to the other side of the sheet metal plate of which the tube is made. This method has an advantage in that there will be less stress induced into the sheet metal material if the bumps stretches all the way from one side to another.

The bumps may be made such that they protrude either on the falling film surface or on the heating medium surface. It may of course also be possible to alternate and have protrusions and indentations on both sides. However, according to one embodiment are the bumps made such that they protrude on the falling film surface.

The cross-sectional area of the stamped bump may for example be trapezoidal. The stamped bumps could thus be uniform and have the shape of an essentially symmetric trapezoid. Alternatively, the stamped bumps have the shape of an unsymmetrical trapezoid, i.e. the trapezoidal shape could be non-uniform, with a less inclined side wall on the leading side, i.e. the front side facing the film flow, compared to a more inclined side wall on the trailing side, i.e. the back side.

The inclination of the side walls of the bump, defined as the angle of inclination from the base surface measured at the half height of the protrusion (e/2), could be in the range of 26 to 90 degrees, preferably from 45 to 80 degrees, and is designed to take into consideration heat transfer enhancement, low fouling behavior and ease of manufacturing. In particular, the leading side wall may be within the range of from 26 to 70 degrees and the trailing side wall within the range of 55 to 80 degrees. The corner roundness Rc could be designed to be within the range of 0.2 to 2.0 mm, more preferably within the range of 0.3 to 1.2 mm, for low fouling behavior and ease of manufacturing.

The application area is of outmost importance for increasing energy efficiency in the evaporation train of a pulp mill, as about ⅓ of the total energy demand for a modern pulp mill is used in the evaporation plant. The total heating surface in the evaporation train in a modern but average pulp mill may exceed 50.000 m$^2$. If an existing evaporation train in a pulp mill needs to meet a higher capacity, when total volumes of spent cooking liquor to be evaporated increases as total production of pulp increases, this increased evaporation capacity may be met by surface modifications of the heat transfer surfaces in an already existing structure. If installed in a new evaporation plant the total installed heating surface may be decreased, enabling major cost reductions.

The heat transfer tube is then finally produced by forming and welding the textured sheet metal strip into a tube, e.g. by butt welding via an axially running weld or butt welding via a spirally running weld. The above described dimensions of the stamped bump (height and width) preferably apply to heat transfer tubes where the diameter of the tube is in the range 20-100 mm, even more preferably 40-60 mm.

The energy efficiency may be increased by up to 100% with these dimensions and orientations of the stamped bumps, while still meeting the requirement of cleaning possibility if precipitation occurs on the heat transfer surfaces during evaporation of the passing thin layer of spent cooking liquor.

In a preferred embodiment of the invention the distance along the longitudinal axis of the heat transfer tube between adjacent stamped bumps, i.e. between an upper edge of a lower stamped bump and a lower edge of an upper stamped bump, is in the range of 3-100 mm, preferably 5-50 mm, and even more preferably 5-20 mm. In this context, lower and upper refers to positions when the heat transfer tube is located such that its longitudinal extension is essentially vertical as is the normal position when a heat transfer tube is used in a plant in an evaporator. By edges in this context is meant where the respective bumps start to protrude (or indent) from the falling film surface. Another way of describing how the distance is measured is to say that the distance is measured between the closest parts of adjacent stamped bumps. In their closest arrangement, the stamped bumps will guarantee a thorough formation of turbulence in the thin film that never settles to a laminar flow. In their most distant arrangement, each stamped bump limits the length of the laminar flow that forms below a preceding stamped bump.

In a preferred embodiment of the invention is the height of said stamped bump in the range 0.4-4.0 mm and even more preferably in the range 0.5-2.0 mm. Keeping the height within the narrower range limits the tubes exposure stress from the stamping operation since less displacement of material is caused due to the lesser height (or depth) of the stamped bump. The height of the stamped bump may be adapted such that higher bumps are used in tubes fed with spent cooking liquor with higher dry matter content than in tubes with lower dry matter content. For example, in a first evaporation effect where the dry matter content in spent liquor fed to the effect is 20%, the height of the stamped bump may be about 0.5 mm as this may be sufficient to cause desired turbulence in the relative low viscosity conditions, while a later evaporation effect fed with spent liquor with dry matter content at 50% may have a height of the stamped bump about 2.0 mm as this may be required to cause desired turbulence at higher viscosity conditions.

Depending on the intended use of the heat transfer tube may different heights be of use but in general will heights in the range of 0.7 to 1.2 mm work quite well and a standard height of 1.0 mm may be used as a suitable height working for a multitude of conditions while also reducing the stress from the stamping operation in the metal sheet material compared to higher bumps.

In a preferred embodiment of the invention, the width of said stamped bump is in the range 1.0 to 15 mm, more preferably 1.5 to 10 mm and even more preferably 2.0-7 mm. The width is of course at least partially dependent on the height; if the bump is rather high there is a need for a certain width in order to create the bump with the desired height.

In a preferred embodiment of the invention, the longitudinal direction of the stamped bumps is inclined in relation to a plane orthogonal to the longitudinal axis of the heat transfer tube and extends helically along at least a portion of the length of the heat transfer tube. The stamped bump is inclined with an angle below or equal to 70 degrees and more preferably below or equal to 60 degrees. In some embodiments, the preferable inclination angle is within the range 1-15 degrees, and in other embodiments within the range 15-45 degrees. In one alternative embodiment may at least two stamped bumps be inclined and extend in parallel, which makes it possible to increase the angle of each stamped bump, i.e. to change the pitch, while the distance, measured in the longitudinal direction of the tube, between adjacent stamped bump portions.

In a further embodiment, the stamped bump may extend within a plane orthogonal to the longitudinal axis of the heat transfer tube. Advantageously, the stamped bump is formed by circular protrusion/indentation on the falling film surface of the heat transfer tube. At least five parallel stamped bumps may be applied to the falling film surface of the heat transfer tube. Advantageously, the distance between each stamped bump along the longitudinal direction of the tube, e.g. between an upper edge of a lower stamped bump and a lower edge of an upper stamped bump, is within the range 3-100 mm, preferably 5-50 mm and even more preferably within the range 5-20 mm. The upper limit of the number of stamped bumps applied along the longitudinal direction of the tube is restricted by the total length of the tube and the distance along the longitudinal direction of the tube between the stamped bumps.

A stamped bump may be formed as a continuous protrusion/indentation from one edge to another of the sheet metal material and fitted in with another protrusion/indentation on the sheet metal material when the sheet is bent and formed into a tube such that a continuous helix shaped protrusion/indentation is formed on the envelope surface comprising a multitude of stamped bumps along the longitudinal extension of the heat transfer tube. Alternatively, or in combination with longer protrusions/indentations, could the stamped bumps be formed by shorter sections of protrusions/indentations and the envelope surface be provided with a plurality of stamped bumps formed by separate protrusions/indentations arranged in line at a distance from one another. In either case, there will be a multitude of bumps following each other along the longitudinal length of the heat transfer tube. In addition to use stamped bumps it may be possible to use weld ridges or wire bumps as a complement to induce turbulence. These weld ridges or wire bumps advantageously have dimensions, i.e. height, width, inclination angle and spacing, within the same range as the above described stamped bumps.

The heat transfer tube according to the invention is suitable for spent liquor with dry matter content above 0.5%, and even more suitable for spent liquor with dry matter content within a range 15-50%.

The heat transfer tube according to the invention is particularly suitable for vertical falling film evaporators.

The invention further relates to a method for manufacturing a heat transfer tube for falling film evaporation of water solutions and suspensions as described above. The method comprises the step of applying one or several protrusions/indentations thus forming a multitude of stamped bumps on a sheet metal material serving as the envelope surface of the heat transfer tube and thus the falling film surface of the heat transfer tube. The stamped bumps are spaced apart along the longitudinal axis of the heat transfer tube from a neighbouring stamped bump by 3 to 250 mm. The stamped bumps have a height or depth in the range 0.3 to 5.0 mm as measured from the base being the envelope surface of the heat transfer tube. The stamped bumps further have a width ($w$; $w_2$) in the range of 1 to 20 mm. The stamped bumps are designed to have an inclination angle versus a plane orthogonal to a longitudinal axis of the heat transfer tube in a range of 0-70 degrees. An inclination angle of 0 degrees means that the stamped bump is extending in a plane orthogonal to the longitudinal extension of the heat transfer tube.

In a method for manufacturing the heat transfer tube the stamped bump may be formed on a flat metal sheet strip to be used as the envelope surface of the heat transfer tube before the flat metal sheet strip is shaped into said heat transfer tube. This may thus be made while forming a planar steel strip into a tube, e.g. on the running metal sheet strip just before the strip is rolled to form the tube. By integrating the application of the stamped bump during the tube forming operation total work hours for manufacturing tubes with stamped bumps could be kept at the same order as for unmodified tubes. Hence, this method of operation has considerable advantages in reducing time and cost for applying the stamped bumps to the heat transfer tubes.

In yet an alternative method for manufacturing the heat transfer tube may the stamped bumps be applied by any suitable method for providing a stamped bump well before form shaping the strip to a tubular form and welding the edges of the steel strip together with a butt fusion weld. The application of the stamped bump on the planar steel strip would enable usage of standard methods for modifying a surface and provide a texture, e.g. by press or stamp forming or roll forming. This method could for example be used in association with the production of the sheet metal material and thus having the textured metal sheet material provided with bumps rolled up. This would for example enable the application of the bumps while the sheet metal material still is heated during production of the metal sheet material.

The stamped bumps may be designed in several different ways. For example, the production may comprise the feature of forming the stamped bumps (SB) on the flat metal sheet strip such that the stamped bump stretches all the way from one side of the flat metal sheet strip to the other side of the flat metal sheet strip. This would reduce the stresses induced in the sheet metal material. According to an alternative, the method may comprise the feature of forming the stamped bumps by stamping the planar steel strip with a multitude of discrete bumps such that a discontinuous pattern of stamped bumps is formed.

It may of course be possible to combine stamped bumps stretching all the way from one side of the flat metal sheet strip to the other side of the flat metal sheet strip with discrete bumps having a discontinuous pattern of stamped bumps.

The stamped bumps may be made by any suitable method available for providing a textured surface with indentations or protrusions, e.g. by press or stamp forming or roll forming.

DRAWINGS

The figures show preferred embodiments of the invention, wherein

FIGS. 1a and 1b shows in orthogonal cross section views a tube evaporator where spent liquor flows as a thin film on the outer surface of the heat transfer tubes;

FIG. 3a shows a first embodiment of the inventive surface modification of the heat transfer tube with an overall continuous helical shape and constant pitch of the stamped bumps on the envelope surface of the heat transfer tube, with an enlarged part shown in FIG. 3b, and FIG. 3c showing a cross section of the stamped bump formed;

Figure 7:
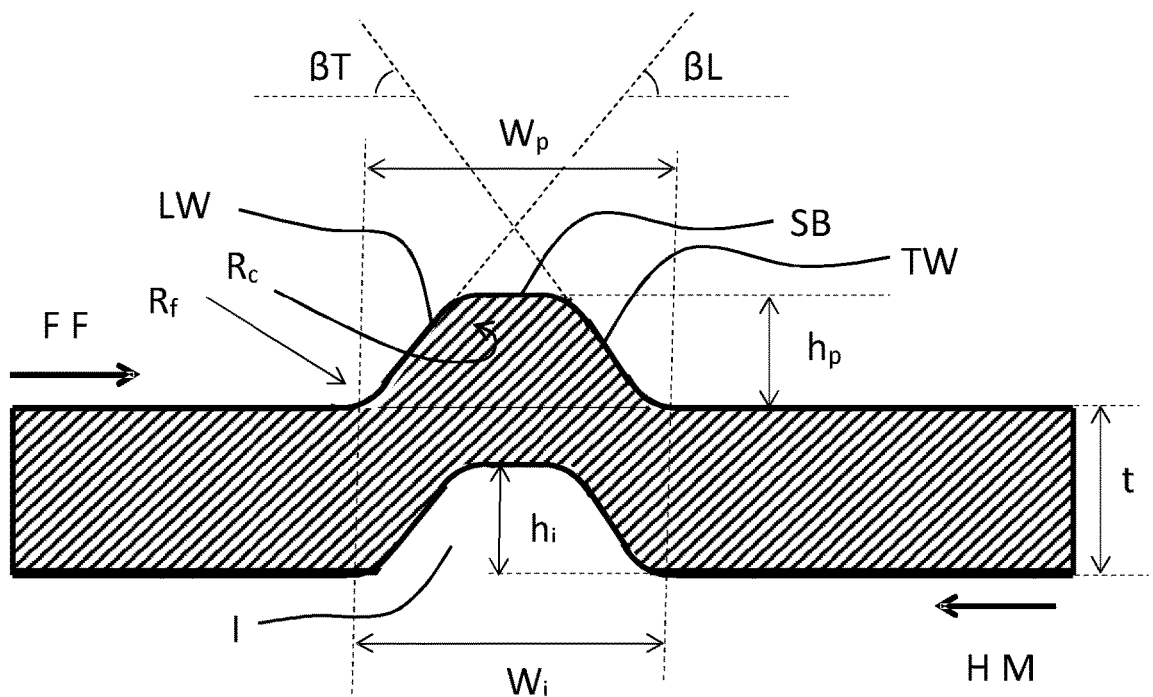

FIG. 4a shows a second embodiment of the inventive surface modification of the heat transfer tube with multiple parallel and continuous stamped bumps being inclined on the envelope surface of the heat transfer tube, with an enlarged part shown in FIG. 4b; and FIG. 5; shows a third embodiment of the inventive surface modification of the heat transfer tube with a multitude of circular stamped bumps, all arranged orthogonal to the longitudinal axis on the envelope surface of the heat transfer tube;

FIG. 6; discloses cross sectional views of alternative symmetries of stamped bumps;

FIG. 7; discloses a detailed cross-sectional view of a stamped bump having a symmetric trapezoidal shape; and FIG. 8; discloses different patterns of and shapes of the contours of stamped bumps on the sheet metal material forming the envelope surface of the heat transfer tube.

DETAILED DESCRIPTION

Throughout this description, a heating medium surface is a surface arranged to be heated by a heating medium, whereas a falling film surface is a surface arranged to have spent liquor passing over it as a falling film.

FIGS. 1a and 1b illustrate schematically a tube evaporator for evaporating spent liquor. The evaporator comprises a shell 1 containing a set 2 with multiple heat transfer tubes 9 arranged vertically in the shell 1.

FIG. 1 is seen in a cross-sectional view through the shell 1, with the heat transfer tubes 9 exposed. FIG. 1b is also seen in a cross-sectional view through the shell 1, but seen from the left-hand side of FIG. 1a. A liquid to be concentrated, in this case spent liquor, is fed through an inlet connection 3 into the shell 1, to the bottom thereof forming a volume of liquid with the surface level below the tubes 9. Liquor is discharged from the bottom of the evaporator through an outlet connection 4 and part of it is pumped by means of a schematically shown pump 5 through a circulating tube 6 into a distributing basin 7 above the set 2, from which basin it flows substantially evenly on steam distribution chambers 8 of the evaporating elements and from there further along outer falling film surfaces of separate heat transfer tubes 9 downwards. At the lower end of the heat transfer tubes 9, the concentrated spent liquor flows along the outer surface of steam collecting chambers 10 and falls subsequently into the liquor in the lower part of the shell 1 and mixes therewith.

To provide evaporation, vapor is led through the heat transfer tubes 9, and it is at first fed in through an inlet channel 11 in the upper part of the set 2 to steam distribution chambers 8 connected to upper parts of the heat transfer tubes 9. From there the vapor enters firstly a connecting chamber 12, which is connected to the upper collecting chambers 8 of the evaporating elements, so that the vapor is distributed through these evenly to all heat transfer tubes 9. Correspondingly, the remaining part of the vapor and condensate are collected, after having passed downwards along inner heating medium surfaces of the heat transfer tubes 9, in the steam collecting chambers 10 of the lower end of the evaporating elements, these collecting chambers being connected to a lower connecting chamber 13. From the lower part of the lower connecting chamber 13 starts an outlet channel 14 for condensate, through which channel the condensate is discharged, and respectively, from the upper part of the connecting chamber 13 starts an outlet channel 15 for vapor, through which channel the remaining heating vapor is exhausted. The water evaporated from the spent liquor under the influence of heating is exhausted as vapor through an outlet connection 16 at the upper end of the shell 1, and respectively, the concentrated liquor is bled off from the recirculation through a pipe 17. Inside the evaporator, in front of the outlet connection 16, there is further a mist separator 18 in such a way that water or liquor drops possibly contained in the exhaust vapor is caught on the mist separator and led back downwards. The mist separator is mounted to be enclosed by a closed housing 19 on each side so that all exhaust vapours must flow through the mist separator 18.

Figure 2:
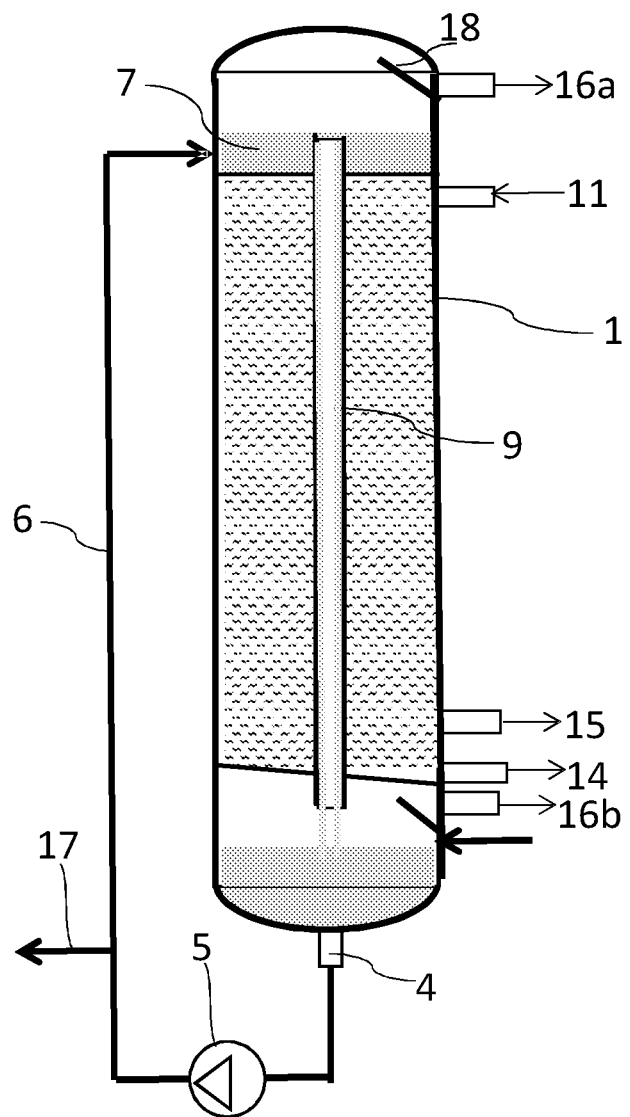
FIG. 2 shows schematically an alternative tube evaporator wherein spent liquor flows as a thin film on the inner surface of the heat transfer tubes.

FIG. 2 illustrate schematically an alternative tube evaporator for evaporating spent liquor, with the difference that the spent liquor is flowing as a thin film on an inner falling film surface of the heat transfer tube. Details with same function as those shown in FIGS. 1 and 2 are given the same reference number. FIG. 2 is seen in a cross-sectional view through the shell 1, with only one of the heat transfer tubes 9 exposed. In a real evaporator are several tubes arranged in parallel, with a distance of about 1-4 centimetres between neighbouring heat transfer tubes 9, and with a tube diameter in the range 2-10 centimetres. A spent liquor to be concentrated is fed through the shell 1, to the bottom thereof forming a volume of spent liquor with the surface level below the heat transfer tubes 9. Spent liquor is discharged from the bottom of the evaporator through an outlet connection 4 and part of it is pumped by means of a schematically shown pump 5 through a circulating tube 6 into a distributing basin 7. From the upper surface level of the basin is spent liquor flowing over the upper edge of the tube and onto the inner falling film surface of the heat transfer tube 9 as a thin film and further downwards. At the lower end of the heat transfer tube 9, the concentrated spent liquor falls into the volume of liquid. While flowing as a thin film over the inner falling film surface of the heat transfer tube 9 is the tube heated by a heating medium at the outer heating medium surface of the heat transfer tube 9, and the film is thus exposed to evaporation during passage. Heating media is supplied via inlet channel 11, and in the lower end is residual steam extracted via outlet channel 15 and clean steam condensate is drained off via outlet channel 14. The dirty steam evaporated from the spent liquor may be bled off via upper outlet connection 16a and lower outlet connection 16b, and preferably are condensate deflectors/mists separator 18 used. The concentrated liquor is bled off from the recirculation through a pipe 17. It should be noted that the heating media may also be steam evaporated from other evaporation stages, and in such cases would the condensate collected in outlet channel 14 not be classified as clean water, instead dirty condensate containing turpentine or other liquids that has a condensation temperature close to that established in the heating media chamber.

The invention may be used on both types of tube evaporators, i.e. where the spent liquor flows as a thin film on an outer falling film surface of the heat transfer tube, as shown in FIGS. 1a and 1b, and where the spent liquor flows as a thin film on an inner falling film surface of the heat transfer tube, as shown in FIG. 2.

In FIG. 3 is a first embodiment of a heat transfer tube 9 according to the invention shown. FIG. 3a shows schematically a view of a heat transfer tube 9. FIG. 3b shows an enlarged portion of FIG. 3a, and FIG. 3c shows a cross sectional view of the stamped bump.

In the figures is:

CC the longitudinal axis of the heat transfer tube 9 and D the diameter of the heat transfer tube;

U corresponds to the upper end of the heat transfer tube and L corresponds to the lower end of the heat transfer tube;

d the distance between adjacent stamped bumps SB perpendicular to the longitudinal extension direction of the continuous protrusion P/indentation forming the stamped bumps SB;

α the inclination angle of the stamped bump SB versus a plane orthogonal to the center axis CC of the heat transfer tube 9, in this embodiment close to 15 degrees;

The distance D between adjacent stamped bumps along the longitudinal axis of the heat transfer tube is d divided by cos α. α corresponds to the angle between D and d;

$h_p$ is the height of the protrusion P of the stamped bump SB measured orthogonally to and relative the falling film surface 20 and $d_i$ is the depth of the corresponding indentation I measured orthogonally to and relative the heating media surface 21; and $w_p$ is the width of the indentation I measured along the falling film surface 20 and orthogonally to the longitudinal direction of the stamped bump SB and $w_i$ is the width of said stamped bump SB measured in the same plane as the heating media surface 21 and orthogonally to the longitudinal direction of the stamped bump SB.

In FIG. 3a is disclosed a heat transfer tube 9 having a continuous protrusion P/indentation I forming a helical pattern on the envelope surface of the heat transfer tube 9. The helical pattern will thus form a multitude of stamped bumps SB crossing an imaginary line running along the envelope surface of the heat transfer tube 9 from one end to another parallel to the longitudinal axis CC. As disclosed in FIG. 3a, the continuous and helically shaped pattern from the protrusion P/indentation I running on the envelope surface of the heat transfer tube should correspond to 18 stamped bumps SB distributed along the envelope surface which intersects or passes an imaginary line on the envelope surface running from the upper end U to the lower end L of the heat transfer tube 9 parallel to the longitudinal axis CC. The pattern, or texture, on the envelope surface is preferably made such that the protrusion P is protruding on a falling film surface 20 of the heat transfer tube 9 and forming a multitude of protruding stamped bumps SB spaced apart along the longitudinal axis of the heat transfer tube. Consequently, there will be a corresponding indentation I on the opposite side, i.e. the heating media surface 21 if the protrusion P is on the falling film surface 20, and there will thus be a corresponding number of indentations or inverted stamped bumps SB on this opposite side. It should be understood that the continuous protrusion P/indentation I may be formed such that the stamped bumps SB instead are protruding on the heating media surface 21 instead of on the falling film surface. However, if it is desired to have the stamped bumps protruding on the falling film surface 20, the stamped bumps shall be oriented to be on an outer falling film surface 20 of the heat transfer tube as shown in FIGS. 1a and 1b on an inner falling film surface of the heat transfer tube as shown in FIG. 2.

The protrusion P and indentation I are formed with a trapezoidal cross section with sharp radius in corners, i.e. preferably with a radius less than 2 mm, and advantageously have essentially the same height $h_p$ of the protrusion P as the depth $d_i$ of the indentation I and essentially the same width $w_p$ of the protrusion P as the width $w_i$ of the indentation I. The height and depth is preferably in the range of 0.5-2.0 mm and the width in the range of 1.5 to 7 mm. The trapezoidal shape disclosed in the figure is symmetric, i.e. the side walls have the same inclination and length on both sides.

FIG. 4 shows a second embodiment of the heat transfer tube 9 according to the invention. FIG. 4a shows schematically the heat transfer tube 9 according to the invention, with multiple elongated protrusions/indentations forming parallel, inclined stamped bumps SB. FIG. 4b shows an enlarged part of the heat transfer tube, wherein:

d is the distance between adjacent stamped bumps SB perpendicular to the longitudinal extension direction of the protrusions/indentations forming the stamped bumps SB, α is the inclination angle of the stamped bumps SB versus a plane orthogonal to the center axis CC of the heat transfer tube 9, in this embodiment about 45 degrees, and D is the distance between adjacent stamped bumps in a direction parallel to the longitudinal axis CC and is calculated as d divided by cos α

The shape and dimensions of the stamped bumps SB may be the same as described in FIG. 3.

FIG. 5a-b show a third embodiment of the heat transfer tube 9 according to the invention, wherein a multitude of stamped bumps SB are formed by circular protrusions P and indentations I extending along the circumference of the envelope surface of the heat transfer tube 9. The features in FIG. 5 are denoted by the same reference numbers or letters as used in FIG. 4. The protrusions P/indentations I forming the stamped bumps SB are arranged orthogonal to the longitudinal axis CC of the heat transfer tube 9. The stamped bumps SB are thus formed by the closed, ring shaped pattern textured in the sheet metal material forming the envelope surface of the heat transfer tube. In this case will the distance D between adjacent stamped bumps SB along the longitudinal axis CC of the heat transfer tube be the same as the distance d, which is the distance between the stamped bumps SB orthogonal to their longitudinal extension, since when $\alpha=0$ will $\cos \alpha$ be $\cos 0=1$ why the distance $D=d/\cos \alpha=d/1=d$.

In FIG. 6 is disclosed different shapes of the cross-sectional area of the protrusions/indentations orthogonally to the longitudinal extension of the protrusions/indentations used to form the stamped bumps SB. The stamped bumps SB have been designed such that the protruding portion is located on the surface where the film flow FF is intended to flow and the indentations are facing the side where the heating media HM is intended to flow.

Figure 6A:
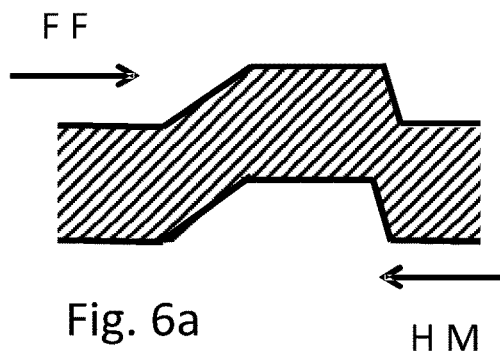

In FIG. 6a is disclosed an asymmetric trapezoidal shape of the stamped bump SB. In this case is the asymmetric trapezoid stamped bump SB designed such that the side with a less inclined side wall is located on the leading side of trapezoid bump, i.e. the front side facing the film flow. Hence, by having a less inclined side facing the film flow FF will there be less risk for solid matter to get stuck and thus a reduced risk of formation of fouling and scaling due to fibres and lignin getting stuck the surface. The other side wall located on the trailing side, i.e. the back side, is more inclined. A more inclined back side has the benefit of a sharper edge between the top portion and the back side wall which is desired in order to better induce turbulence in the flow after passing the stamped bump. Hence, an asymmetric trapezoid, designed with a less steep front sidewall side facing the film flow than the back sidewall may have the benefit of both reducing the risk of fouling as well as providing more turbulent flow when film flow is leaving the stamped bump SB on the backside wall. On the opposite side, where the heating media HM is flowing in the opposite direction, will there be a rather sharp edge when the heating media is entering the indentation I which may cause a turbulence in the flow at entering the indentations I. However, there is a rather soft curvature within the indentation and less inclined edge in the pocket at the side where the heating media HM is leaving the pocket will reduce the risk for particles or other solid matter to get stuck in the indentation.

Figure 6B:
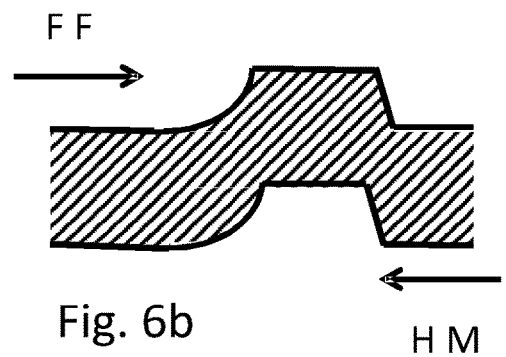

In FIG. 6b is a somewhat different shape disclosed wherein the leading sidewall of the protrusion is designed to be rounded having a concave shape towards the film surface and being essentially circular. The backside wall is shaped essentially the same way as disclosed in FIG. 6a. In this case may there be further advantages in that there is a very steep angle between the concave leading sidewall and the top side of the stamped bump which most probably will induce turbulence in the film flow FF when passing this edge. Hence, it may be advantageous to have a longer top side since the film flow flowing passing over the top side surface will probably be turbulent after changing direction at this edge. In addition is the backside designed in the same way as described in FIG. 6a and the angle at the edge between the top side and the trailing side wall will thus be the same as in FIG. 6a. In addition the rounded design of the leading side wall facing the flow will reduce the risk of fouling due to the smooth transition between the planar falling film surface and the leading side wall. On the opposite surface, facing the heating media HM, will the flow entering the indentation pass over a rather sharp edge when entering into the indentation and likewise meet a rather sharp angled corner at the bottom of the indentation where the side wall and the bottom surface meet. On the other side of the indentation, where the flow leaves the indentation, is there a circular shaped side wall.

Figure 6C:
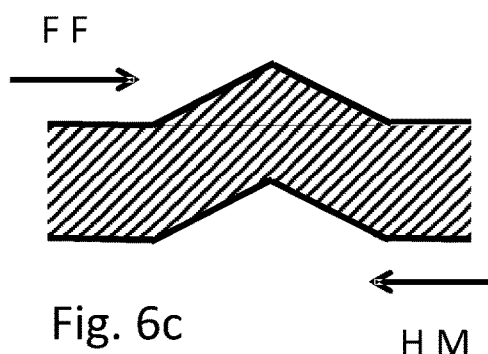

In FIG. 6c is an alternative design of a symmetric shape of the stamped bump SB disclosed which essentially is v shaped and thus not have any, or at least very short, top side and essentially identical leading sidewall facing the flow and trailing sidewall on the back side of the stamped bump. On the other side is a corresponding V-shaped indentation where the heating media flow HM passes.

Figure 6D:
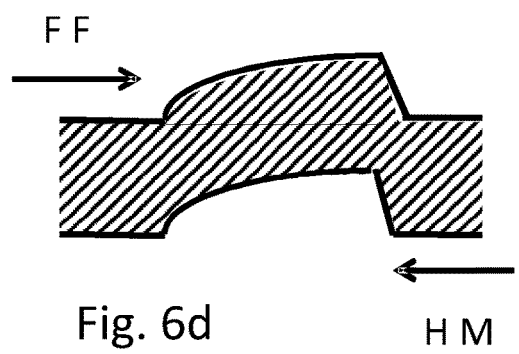

In FIG. 6d is still an alternative design of the stamped bump SB disclosed in which the leading sidewall of the protrusion on the film flow FF surface is designed to be rounded, as in the design disclosed in FIG. 6b, but in this case is the leading sidewall convex, and somewhat elliptical, towards the film flow surface. The trailing edge is essentially shaped the same way as in FIGS. 6a and 6b. The indentation on the heating media HM surface corresponds to and fits onto the contour of the bump as has been the case also in FIGS. 6a-6c. Also in this case, as in FIGS. 6a and 6b, is there a more abrupt change of the flow for film flow FF at the trailing side wall, at the backside, than at the leading sidewall facing the flow.

The above disclosed shapes only exemplify a few further examples in addition to the symmetric trapezoidal shape disclosed in FIG. 3c. The desired shape and dimensions is dependent on the flow properties, e.g. flow velocity and viscosity. In addition, there may also be restrictions in what shapes and dimensions that is possible to achieve when modifying the sheet metal material and producing the stamped bumps.

To use stamped bumps SB in the heat transfer tubes will provide for an efficient heat transfer surface manufacturing process with no or minimal waste of materials and high automation potential. The use of a surface modification and formation of a specific texture on both sides of the heat transfer tube envelope surface by stamped bumps will enable an enhanced heat transfer while also having a low fouling propensity for water solutions containing fibres, particles and dissolved organic substance and salts. By designing the protrusions P/Indentations I properly and arranging the stamped bumps SB in specific patterns may also reduction or even elimination of rip currents and dry out surface areas be possible by enhanced falling film flow equalization design and it may be possible to considerably enhance the efficiency and the heat transfer capability by enhancing turbulence in both the evaporation side and the condensation side falling films.

In FIG. 7 is disclosed a detailed view of the cross-section perpendicular to the longitudinal extension of the symmetric trapezoidal stamped bump SB in FIG. 3c. As earlier disclosed, the stamped bump is preferably protruding on the surface side utilized as the evaporation surface side and the surface side with indentation is facing the heating media. The height of the protrusion $h_p$ should preferably be in the range of both the falling film thickness and the thickness of the heat transfer surface t for best performance. The width of the protrusion $W_p$ is defined as the distance perpendicular to the longitudinal extension of the protrusion P at the base of the protrusion P. In an alternate way, the width may be measured at half the height the protrusion ($h_p/2$), still perpendicular to the extension direction of the stamped bump SB, between the side wall facing the falling film flow, i.e. the leading wall LW, and the side wall on the backside, i.e. the trailing wall TW. This method may be easier to define since it may sometimes be hard to decide where the base starts to incline. However, in this context has the width at the base been used and in case there should be any doubt about if where to measure the base point is defined as the location where each of the leading side wall angle βL and the trailing side wall angle βT is above 5 degrees, i.e. where the inclination angle of the leading wall LW respectively of the trailing wall TW relative the surface is more than 5 degrees. The opposite side of the surface, which normally is the heating media HM surface heated by condensing steam, will be formed as an indentation shaped as an inverted image of the protrusion on the falling film FF surface side. The indentation may also function as a turbulence inducer for enhancing the condensation heat transfer process. In addition to the height of the protrusion $h_p$, the inclination angles of the of the leading side wall angle βL and the trailing side wall angle βT of the protrusion, the roundness of both sides of the top of the protrusions (Rc) and the roundness of the inside corners "fillet radius (Rf) are all of utmost importance for the creation of high heat transfer intensification, low fibre and particles fouling propensity and low manufacturing cost. The inclination angle (S) of the leading side wall angle βL and the trailing side wall angle βT of the protrusion are defined as the angle of inclination from the base surface measured at the half height of the protrusion (e/2). the leading side wall angle βL and the trailing side wall angle βT may differ, as is readily understood from some of the examples in FIG. 6, but they should all be within the specified range of the chosen design side wall parameters.

The height of the ridges or protrusions (e) should, for best performance, be in the range of both the falling film thickness and the thickness of the heat transfer surface t which gives a preferred range of the height of the protrusion $h_p$ of 0.3 to 5.0 mm. Also important for best performance is the inclination angle of the two side walls of the protrusion, which are βL for the leading side wall facing the falling film flow, and βT for the trailing side wall. The side wall angles should preferably be 26° to 90°, more preferably 45° to 80°. In general, the angle of the leading side wall βL and the trailing side wall are equal or the trailing side wall is more inclined. In order to assure a desired turbulence in the falling film flow is it important that the trailing side wall is sufficiently inclined why the trailing side wall angle βT could be more acute than the leading side wall angle βL. The side wall angles should be designed while taking into account heat transfer enhancement due to flow properties and inducing turbulence in the falling film, low fouling behaviour and ease of manufacturing. The corner radius (roundness) (Rc) of both sides of the top of the protrusions should be 0.2 to 2.0 mm preferably 0.3 to 1.2 mm, more preferably or 0.4 to 0.8 mm and a suitable value during normal circumstances is around 0.5 mm) for low fouling behaviour and ease of manufacturing. The fillet radius (Rf) and both corner radius and fillet radius for the pocket side are allowed to be 25% higher than Rc because of less sensitivity of the enhanced heat transfer behaviour for these positions. Hence, the stamped bumps SB should be designed to keep fibre and particle fouling within acceptable limits which thus is limiting both high inclinations and low corner radius on top of the protrusions. On the other hand, heat transfer enhancement and fluid flow equalization over the width of the heat transfer surface are improved by high inclinations and low corner radius on top and the sides of the protrusions why there is need to find a design inducing a desired turbulence and keeping fouling low. For the indentation on the heating media side of the heat transfer surface is essentially the same height and radius preferred as for the falling film side but smaller deviations (+25%) can be tolerated Further parameter which affects the efficiency of the heat transfer is the width of the protrusion $W_p$ which is 1-20 mm, more preferably 1.0 to 15 mm, even more preferably 1.5 to 10 mm and most preferably 2.0-8 mm). The length of the protrusion may vary widely and is generally not considered to be of the same relevance as the parameters listed above. However, the length may be of interest in finding desired patterns of the stamped bumps adapted to provide a desired flow and avoid dry zones or ensuring the falling film will not find its way down bypassing the stamped bumps SB. The stamped bumps SB may be formed by protrusions P/Indentations I stretching several turns around the envelope surface of the heat transfer tube. However, the length of the protrusions P/Indentations I if not extending more than one turn shall generally be at least 10 mm. From the point of view of manufacturing, the length of the protrusions P/Indentations I may be decided by the size of the sheet material used for manufacturing the heat transfer tube since it may be an advantage to form protrusions and indentations which stretches from one side to another of a sheet metal material in order to reduce stresses induced in the material while forming the protrusions P/Indentations I. For any individual (not continuous) protrusion in horizontal arrangement, the outer left and right corners, by viewing in the direction of the falling film flow, should have the same corner radiuses (Rp) in the plane of the metal surface as defined for the corner radius Rc for both sides of the top of the protrusion. This will facilitate an even flow field across the surface and reduce the tendency of the surface tension to create rip currents and dry out surface areas Protrusions are preferably utilized on the falling film surface and its corresponding indentations subsequently used on the heating "condensation" side but it is obvious that the opposite arrangement also could be used as well as having both protrusions and indentations on the same side.

FIG. 8 discloses a multitude of different possible arrangements of the stamped bumps SB and serves as further examples in addition to the ones disclosed in FIGS. 3-5. In FIG. 8a is disclosed a multitude of individual protrusions P/Indentations I located along the circumference of the envelope surface of a heat transfer surface. The protrusions P/Indentations I are forming a multitude of discontinues lines in several different planes orthogonal to the longitudinal axis of the heat transfer tube and the longitudinal extension of the protrusions P/Indentations I are also aligned with those planes. The individual protrusions P/Indentations I are staggered relative each other as seen in a direction parallel to the longitudinal axis of the heat transfer tube.

Figure 8A:
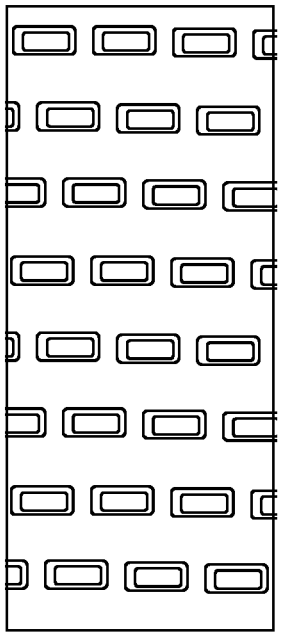
Figure 8B:
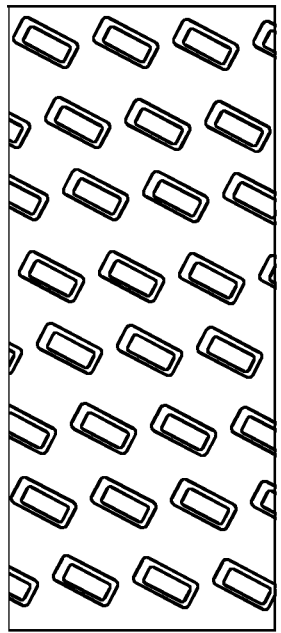

In the next pattern disclosed in FIG. 8b are the same kind of protrusions P/Indentations I used as in FIG. 8a and the protrusions P/Indentations I are also located in several different planes orthogonal to the longitudinal axis of the heat transfer tube as in FIG. 8a. However, in this case is each of the individual protrusions P/Indentations I inclined relative a plane orthogonal to the longitudinal axis of the heat transfer tube. The formation is expected to cause the falling film to be slowly screwed on its way from the top to the bottom while slowly flowing on the heat transfer tube envelope surface.

Figure 8C:
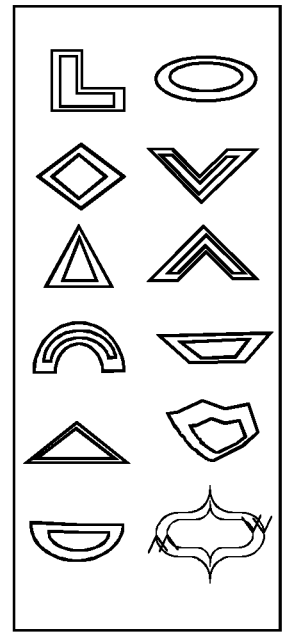

FIG. 8c is merely disclosed in order to show that there may be a multitude of alternative shapes of stamped bumps SB which may be used. There is a considerable improvement in the heat transfer efficiency regardless of the shape of the stamped bumps as long as there is an induced turbulence in the falling film flow. Turbulence will be induced regardless of the shapes of the stamped bumps.

Figure 8D:
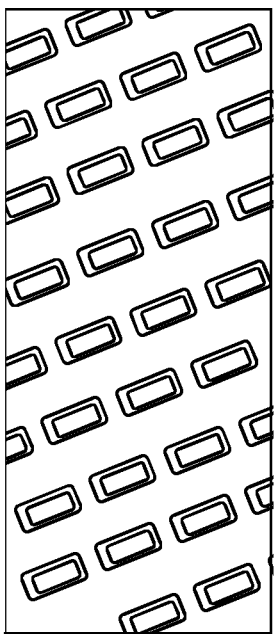

In FIG. 8d are there a multitude of the same kind of protrusions P/Indentations I used as in FIGS. 8a and 8b. The protrusions will shape a pattern as disclosed in FIG. 4 of parallel, inclined stamped bumps SB made up of individual rectangular protrusions P/Indentations I being aligned in rows wherein the longitudinal axis of each individual protrusion P/Indentation I is inclined and aligned with the longitudinal axis of the discontinuous inclined rows of protrusions P/Indentations I. Hence, this design corresponds to the suggested design in FIG. 4 except for that this design is made up of shorter individual protrusions instead of longer continuous protrusions. If the inclination angle is decreased it may be possible to provide a helically inclined pattern as in FIG. 3 but with the same difference as when compared to FIG. 3, i.e. that this design is made up of shorter individual protrusions instead of longer, possibly only one in the design in FIG. 3.

Figure 8E:
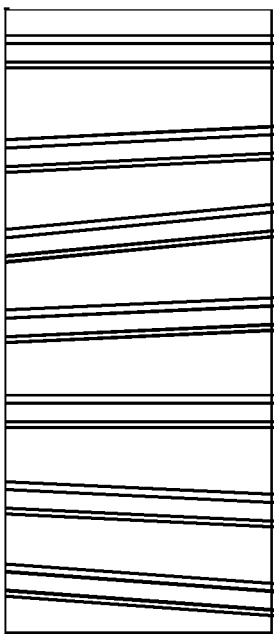

In FIG. 8e is disclosed an arrangement in which continuous protrusions P/Indentations I are provided on the surface of the heat transfer tube envelope surface. In this case it is obvious that these protrusions P/Indentations I may not continue too long since they will coincide with each other since the different protrusions P/Indentations I not are parallel and it will not be possible to manufacture such crossing patterns by using ordinary stamping methods. It may for example be possible to produce such a pattern for certain restricted distances.

Figure 8F:
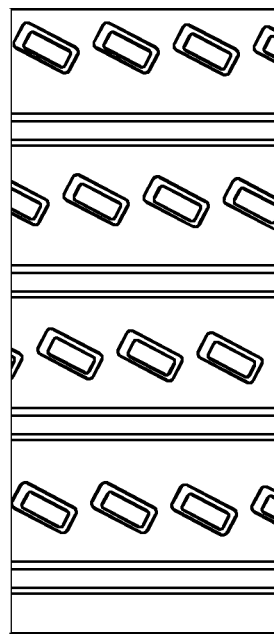

In FIG. 8f is designed a pattern of the protrusions P/Indentations I forming the stamped bumps using both continuous protrusions P/Indentations I, in every second ring line of stamped bumps in separate planes orthogonal to the longitudinal axis of the heat transfer tube, and individual smaller segments of protrusions P/Indentations I in every other ring line of stamped bumps, also in separate planes orthogonal to the longitudinal axis of the heat transfer tube so as to form a discontinuous ring of inclined protrusions P/Indentations I in between the continuous protrusions P/Indentations I. Another way of describing this arrangement is that it is a combination of the embodiments disclosed in FIG. 5 and FIG. 8b and every second ring shaped on the envelope surface of the heat transfer tube comes from the design in FIGS. 5 and 8b.

The scope of protection is not limited to the above described embodiments. The skilled person understands that the embodiments can be modified and combined in many different ways without parting from the scope of the invention. For example, the stamped bumps, in the figures may be discontinuous and they may be arranged on any of the inner and outer surfaces of the heat transfer tubes.

The invention claimed is:

1. A heat transfer tube for falling film evaporation of water solutions and suspensions emanating from handling of materials of biological origin, the heat transfer tube having:
   a heating medium surface configured to be heated by a heating medium; and
   a falling film surface opposite and facing away from the heating medium surface, the falling film surface configured to have spent liquor pass over the falling film surface as a falling film and configured to evaporate solvent from the falling film and thus increase dry matter content;
   wherein the heat transfer tube comprises a sheet metal material,
   wherein the falling film surface of the heat transfer tube is equipped with a multitude of stamped bumps formed by protrusions or indentations,
   wherein each stamped bump is spaced apart along a longitudinal axis of the heat transfer tube from a neighbouring stamped bump by 3-250 mm, has a height or depth in the range of 0.3-5.0 mm, has a width in the range 1.0-20 mm, and has an inclination angle versus an orthogonal plane that is orthogonal to the longitudinal axis of the heat transfer tube in a range of 0-70 degrees.

2. The heat transfer tube according to claim 1, wherein the stamped bumps are configured to stretch continuously from one side of the sheet metal material to an other side of the sheet metal material of which the heat transfer tube is made.

3. The heat transfer tube according to claim 1, wherein the stamped bumps are configured to protrude from the falling film surface.

4. The heat transfer tube according to claim 1, wherein a distance along the longitudinal axis of the heat transfer tube between adjacent stamped bumps is in the range 3-100 mm.

5. The heat transfer tube according to claim 1, wherein the height of the stamped bumps are in the range 0.5-2.0 mm.

6. The heat transfer tube according to claim 1, wherein at least one of the stamped bumps is inclined in relation to the orthogonal plane.

7. The heat transfer tube according to claim 1, wherein at least one of the stamped bumps extends within a plane orthogonal to the longitudinal axis of the heat transfer tube.

8. The heat transfer tube according to claim 1, wherein the stamped bumps have a corner roundness of both sides of the top and the side walls of the protruding stamped bumps of 0.2-2.0 mm.

9. The heat transfer tube according to claim 1, wherein side walls of the stamped bumps have an inclination angle between 26-90 degrees.

10. The heat transfer tube according to claim 1, wherein the stamped bumps have the shape of an essentially symmetric trapezoid.

11. The heat transfer tube according to claim 1, wherein the stamped bumps have the shape of an unsymmetrical trapezoid with a less inclined front side wall on a leading side facing a film flow, and a more inclined back side wall on a trailing side.

12. A method for manufacturing a heat transfer tube for falling film evaporation of water solutions and suspensions emanating from handling of materials of biological origin, which method comprises the step of assembling the heat transfer tube having:
   a heating medium surface configured to be heated by a heating medium;
   a falling film surface opposite and facing away from the heating medium surface, the falling film surface configured to have spent liquor containing lignin and other dissolved components from cellulosic material and/or inorganics from cellulosic material and chemicals used pass over the falling film surface as a falling film and configured to evaporate solvent from the falling film and thus increase dry matter content,
   wherein the heat transfer tube is made from a sheet metal material, wherein the method comprises the step of forming one or more protrusions/indentations on an envelope surface of the heat transfer tube in order to form a multitude of stamped bumps on the falling film surface of the heat transfer tube whereby neighbouring stamped bumps along a line parallel to a longitudinal axis of the heat transfer tube are spaced apart from each other by 3-250 mm along the longitudinal extension of the heat transfer tube, the stamped bumps having a height or depth in the range 0.3-5.0 mm, having a width in the range 1-20 mm; having an inclination angle versus an orthogonal plane that is orthogonal to the longitudinal axis of the heat transfer tube in a range of 0-70 degrees.

13. The method for manufacturing the heat transfer tube according to claim 12, wherein the method comprises the step of shaping the one or more protrusions/indentations forming the stamped bumps on the falling film surface onto a flat sheet metal strip before or while forming the flat sheet metal strip into the heat transfer tube.

14. The method for manufacturing the heat transfer tube according to claim 13, wherein the method comprises the feature of forming the stamped bumps on the flat sheet metal strip such that the stamped bump stretches all the way from one side of the flat sheet metal strip to another side of the flat sheet metal strip.

15. The method for manufacturing the heat transfer tube according to claim 12, wherein the method comprises the feature of shaping a flat metal sheet strip to a tubular form by spiral shaping and welding the edges of the flat metal sheet strip together with a butt fusion weld.

16. The method for manufacturing the heat transfer tube according to claim 12, wherein the heat transfer tube is a vertical falling film heat transfer tube.

17. The method for manufacturing the heat transfer tube according to claim 12, wherein the heat transfer tube is a falling film heat transfer tube in a vertical falling film evaporator, the vertical falling film evaporator comprising a plurality of vertically arranged falling film heat transfer tubes.

18. The heat transfer tube according to claim 1, wherein the heat transfer tube is a vertical falling film heat transfer tube.

19. The heat transfer tube according to claim 1, wherein the heat transfer tube is a falling film heat transfer tube in a vertical falling film evaporator, the vertical falling film evaporator comprising a plurality of vertically arranged falling film heat transfer tubes.

* * * * *